US008548737B2

(12) United States Patent
Kobayashi et al.

(10) Patent No.: US 8,548,737 B2
(45) Date of Patent: Oct. 1, 2013

(54) NAVIGATION APPARATUS

(75) Inventors: Yuta Kobayashi, Sagamihara (JP);
Noriyuki Abe, Yokohama (JP); Katsuya Asada, Zama (JP); Shigeru Shimada, Kodaira (JP); Kishiko Maruyama, Kokubunji (JP); Akinori Asahara, Kokubunji (JP)

(73) Assignee: Xanavi Informatics Corporation, Zama-shi (JP)

( * ) Notice: Subject to any disclaimer, the term of this patent is extended or adjusted under 35 U.S.C. 154(b) by 784 days.

(21) Appl. No.: 12/333,077

(22) Filed: Dec. 11, 2008

(65) Prior Publication Data

US 2009/0157296 A1    Jun. 18, 2009

(30) Foreign Application Priority Data

Dec. 12, 2007   (JP) .................................. 2007-320590

(51) Int. Cl.
*G01C 21/34* (2006.01)
(52) U.S. Cl.
USPC .......................................... 701/428; 701/429
(58) Field of Classification Search
USPC ................. 701/208, 209, 211, 410, 428, 429, 701/431; 340/995.1, 995.19, 995.27, 996
See application file for complete search history.

(56) References Cited

U.S. PATENT DOCUMENTS

| 5,802,492 | A  | * | 9/1998  | DeLorme et al. ........... 455/456.5 |
| 5,835,881 | A  | * | 11/1998 | Trovato et al. ................. 701/431 |
| 6,321,158 | B1 | * | 11/2001 | DeLorme et al. ............. 701/426 |
| 6,885,937 | B1 | * | 4/2005  | Suranyi ......................... 701/533 |
| 7,509,215 | B2 | * | 3/2009  | Shen et al. .................... 701/438 |
| 2003/0078726 | A1 | * | 4/2003 | Fukushima et al. .......... 701/209 |
| 2003/0182052 | A1 | * | 9/2003 | DeLorme et al. ............. 701/201 |
| 2008/0221792 | A1 | * | 9/2008 | Nakayama ..................... 701/211 |
| 2009/0055093 | A1 | * | 2/2009 | Hamilton et al. ............. 701/209 |

FOREIGN PATENT DOCUMENTS

| JP | 2001-249022 A | 9/2001 |
| JP | 2004-56714 A  | 2/2004 |
| JP | 2004-170359 A | 6/2004 |
| JP | 2004-233368 A | 8/2004 |
| JP | 2006-199264 A | 8/2006 |
| JP | 2006-284677 A | 10/2006 |
| JP | 2007-240480 A | 9/2007 |

OTHER PUBLICATIONS

Japanese Office Action dated Jan. 31, 2012 with English translation (seven (7) pages).

* cited by examiner

*Primary Examiner* — Prasad Gokhale
(74) *Attorney, Agent, or Firm* — Crowell & Moring LLP

(57) ABSTRACT

A navigation apparatus comprises a map display control unit that displays a map on a display monitor, a voice information outputting unit that outputs voice information related to traveling of a vehicle, and a highlighting unit that highlights a part of the map that corresponds to the voice information in synchronization with output of the voice information by the voice information outputting unit.

3 Claims, 5 Drawing Sheets

NAVIGATION APPARATUS

INCORPORATION BY REFERENCE

The disclosure of the following priority application is herein incorporated by reference: Japanese Patent Application No. 2007-320590 filed Dec. 12, 2007

BACKGROUND OF THE INVENTION

1. Field of the Invention

The present invention relates to a navigation apparatus for vehicles.

2. Description of Related Art

There is a known navigation apparatus that outputs various voice information related to traveling of the vehicle along with displaying a map in order to provide the driver with necessary information for driving in an easily understood manner. For example, Japanese Laid-Open Patent Application No. 2004-170359 discloses a navigation apparatus that displays a magnified map of an intersection at which the vehicle turns right or left when the vehicle approaches it, and guides the driver with voice information about the distance to the intersection and direction of travel at the intersection.

With the conventional navigation apparatus described above, when a piece of information is output, it is difficult for the driver to understand which part of the map the piece of information corresponds to because the map includes various information.

SUMMARY OF THE INVENTION

A navigation apparatus according to a first aspect of the present invention comprises a map display control unit that displays a map on a display monitor, a voice information outputting unit that outputs voice information related to traveling of a vehicle, and a highlighting unit that highlights a part of the map that corresponds to the voice information in synchronization with output of the voice information by the voice information outputting unit.

According to a second aspect of the present invention, in the navigation apparatus of the first aspect, it is preferable that the highlighting unit starts highlighting the part that corresponds to the voice information when the voice information outputting unit starts outputting of the voice information, and that the highlighting unit terminates highlighting the part that corresponds to the voice information when the voice information outputting unit terminates outputting of the voice information.

According to a third aspect of the present invention, the navigation apparatus of the first or second aspect may further comprise a selection unit that selects an event to be voice-guided according to an operation by a user and a determination unit that determines contents of the voice information according to the event selected by the selection unit.

According to a fourth aspect of the present invention, in the navigation apparatus of any one of the first through third aspects, the highlighting unit can highlight the part that corresponds to the voice information by changing the part in any of flashing, color, shape, size, font, background color, or presence of shadow.

According to a fifth aspect of the present invention, in the navigation apparatus of any one of the first through fourth aspects, the map display control unit may display a whole route map in which a plurality of routes are abridged on the display monitor.

According to a sixth aspect of the present invention, in the navigation apparatus of the third aspect, the selection unit can select at least one of an optimal route, traffic congestion, a speed limit, a closed road, a traffic accident, a passing road, a passing intersection, necessary time for destination, drive time, a facility at which the vehicle can stop off, gas mileage, a toll, and drivability, as the event.

DESCRIPTION OF PREFERRED EMBODIMENTS

Figure 1:
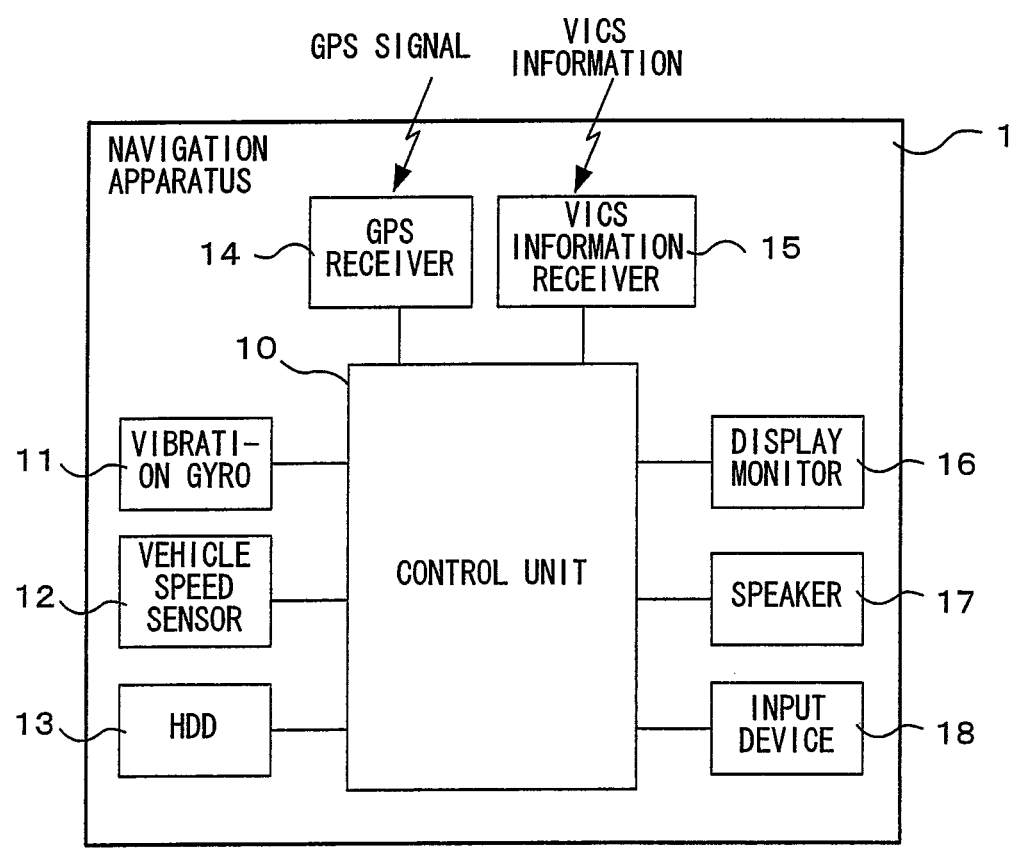
FIG. 1 is a block diagram showing the structure of a navigation apparatus according to an embodiment of the present invention.

The structure of the navigation apparatus according to an embodiment of the present invention is shown in FIG. 1. As shown in FIG. 1, a navigation apparatus 1 comprises a control unit 10, a vibration gyro 11, a vehicle speed sensor 12, a hard disk drive (HDD) 13, a Global Positioning System (GPS) receiver 14, a Vehicle Information and Communication System (VICS) information receiver 15, a display monitor 16, a speaker 17, and an input device 18.

The control unit 10 consists of a micro processor and various peripheral circuitry, a RAM, a ROM, and so on, and performs various types of procedures which will be explained hereinafter based upon a control program and map data which are stored in the HDD 13.

The vibration gyro 11 is a sensor for detecting the angular velocity of the vehicle. The vehicle speed sensor 12 is a sensor for detecting the vehicle speed. By these sensors detecting motion state of the vehicle at a predetermined interval, the travel distance of the vehicle is obtained by the control unit 10. And, the current position of the vehicle is detected thereby.

The HDD 13 is a nonvolatile recording medium in which various data including map data are recorded. The data recorded in the HDD 13 are read out by control of the control unit 10 as necessary so as to be used for various types of procedures and control executed by the control unit 10.

It should be understood that the map data recorded in the HDD 13 includes route calculation data, route guidance data, road data, and background data. The route calculation data is used for searching route to a destination. The route guidance data is used for guiding the vehicle to the destination according to a route which has been set, and indicates intersection names, road names and the like. The road data indicates the shape and categories of the road. The background data indicates map shapes other than roads, such as rivers, railroads and the like, and positions of various types of facilities, and so on. It should be understood that in map data the minimum unit which indicates each road is termed a link. In other words, in map data, each road is made up from a plurality of links.

The GPS receiver 14 receives GPS signals sent from GPS satellite and outputs them to the control unit 10. A GPS signal includes GPS satellite position and time at which the GPS signal was sent as information for obtaining position of the vehicle and current time. Accordingly, by receiving GPS signals from more than a predetermined number of GPS satellites, position of the vehicle and current time can be calculated based on these information.

The VICS information receiver 15 receives VICS information sent from VICS center (not shown in FIG. 1) to the navigation apparatus 1. With this VICS information, various types of road traffic information such as traffic congestion information, traffic control information and the like. The VICS information received by the VICS information receiver 15 is outputted to the control unit 10. Map display processing performed by the control unit 10 causes the contents of the VICS information to be displayed on a map on the display monitor 16.

It should be understood that transmission of VICS information from the VICS center to the navigation apparatus 1 is performed by radio beacons installed mainly on expressways, optical beacons installed mainly on general roads, or FM multiplex broadcastings. A radio beacon and an optical beacon locally send VICS information by radio waves or light (infrared ray) to vehicles that pass through the installation spots. An FM multiplex broadcasting, on the other hand, sends VICS information to a relatively large area.

The display monitor 16 is a device for displaying various types of images, videos, and the like, for which a liquid-crystal display or the like is used. On the display monitor 16, maps with various types of contents are displayed in the navigation apparatus 1 which include, for instance, a normal map showing the surroundings of the vehicle position, a whole route map showing an abridged route, an intersection guidance map showing simplified road shape between the vehicle position to the next directed intersection, and the like. It should be understood that the display monitor 16 is mounted on an easily viewed position from the driver seat such as on the dashboard of the vehicle, in the instrument panel, or the like.

The speaker 17 is controlled by the control unit 10 to output various voice information related to traveling of the vehicle. For example, route guidance voice for guiding the vehicle to the destination according to a recommended route, various types of warning tones, and the like are outputted.

The input device 18 is a device with various types of input switches for the user to perform various types of input operations for operating the navigation apparatus 1. By operating the input device 18, the user can, for instance, input a name or the like of a facility or a place that the user selects for the destination, select the destination from among pre-registered places, and scroll the map in any direction. The input device 18 is achieved by an operation panel, a remote controller, or the like. Or, the input device 18 and the display monitor 16 may be integrated into a touchscreen.

After the user operates the input device 18 to set the destination, the navigation apparatus 1 performs route search processing by a predetermined algorithm operation based on the route calculation data described above with current position of the vehicle as a departure point. When a plurality of routes from the departure point to the destination are searched by this route search processing, the navigation apparatus 1 displays the whole route map on the display monitor 16 as described above, and informs the user of whole situation of each of the routes.

When any one of the routes displayed in the whole route map is selected by the user, the navigation apparatus 1 sets the selected route as a recommended route. The navigation apparatus 1 displays the recommended route on the map using a color different from those for other roads so that the user can easily recognize, and guides the vehicle to the destination. At this time, the navigation apparatus 1 guides the vehicle by directing the user a direction of travel in image, voice, or the like so that the vehicle can travel according to the recommended route. By doing this, route guidance to the destination is performed.

Figure 2:
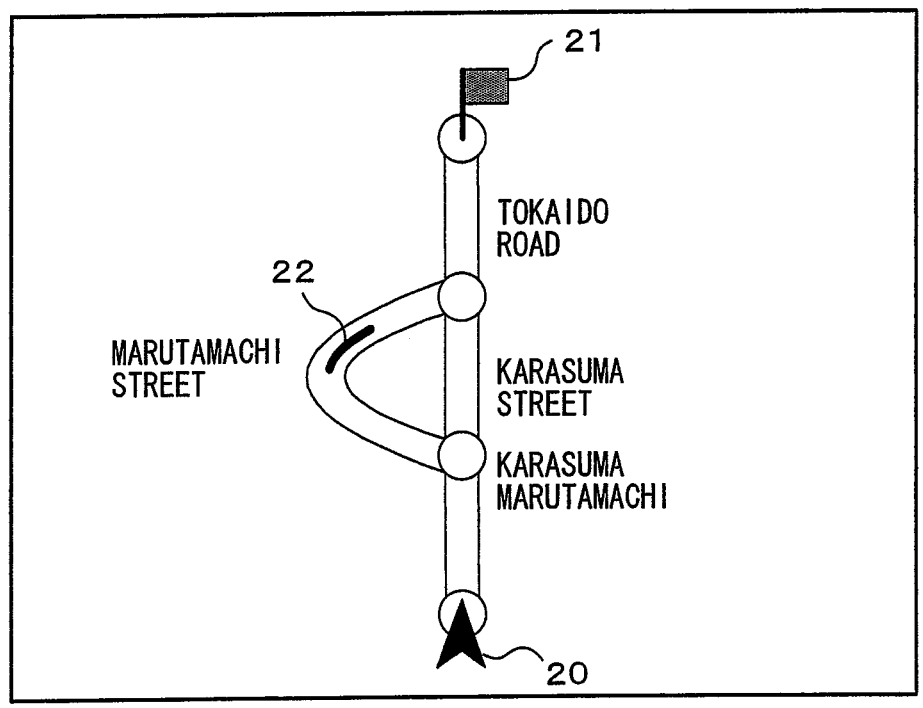
FIG. 2 is a figure showing an example of a whole route map.

FIG. 2 shows an example of a whole route map that is displayed on the display monitor 16 in the navigation apparatus 1. This whole route map shows that there are a route (first route) that goes through Karasuma Street and Tokaido Road and a route (second route) that goes through Marutamachi Street and Tokaido Road between the vehicle position indicated by the reference symbol 20 and the destination indicated by the reference symbol 21. It should be understood that the reference symbol 22 indicates a traffic congestion mark showing that there is a traffic congestion in Marutamachi Street.

When the whole route map as described in FIG. 2 is being displayed on the display monitor 16, control processing by the control unit 10 causes voice information with various contents related to traveling of the vehicle to be outputted through the speaker 17. The content of the voice information outputted hereat is determined in accordance with an event selected according to the operation by the user. In other words, when the user selects any of various types of events (pieces of information) related to the whole route map of FIG. 2 as an event to be voice-guided, the navigation apparatus 1 performs speech on the event and outputs voice information.

It is possible to output voice information from the navigation apparatus 1 related to one or more events the user selected including the optimal route in the whole route map of FIG. 2, traffic congestion, traffic control such as speed limits or closed roads, traffic accidents, passing roads, passing intersections, necessary time for the destination, drive time, facilities at which the vehicle can stop off, gas mileage, a toll, or drivability of vehicle. It should be understood that the optimal route is a route which is believed to be the most suitable for traveling to the destination and is determined based on necessary time, distance, and so on. Drivability of vehicle is determined based on road width, the number of lanes, speed limit, the number of intersections at which the vehicle turns right or left along the way, the presence or absence of high-accident location, or the like.

Furthermore, when voice information is outputted in the above described manner, simultaneously a part of the whole route map that corresponds to the voice information is highlighted on the display monitor 16. The part of a map that is highlighted in synchronization with the output of the voice information in this manner will be hereinafter termed a highlight subject part.

Figure 3:
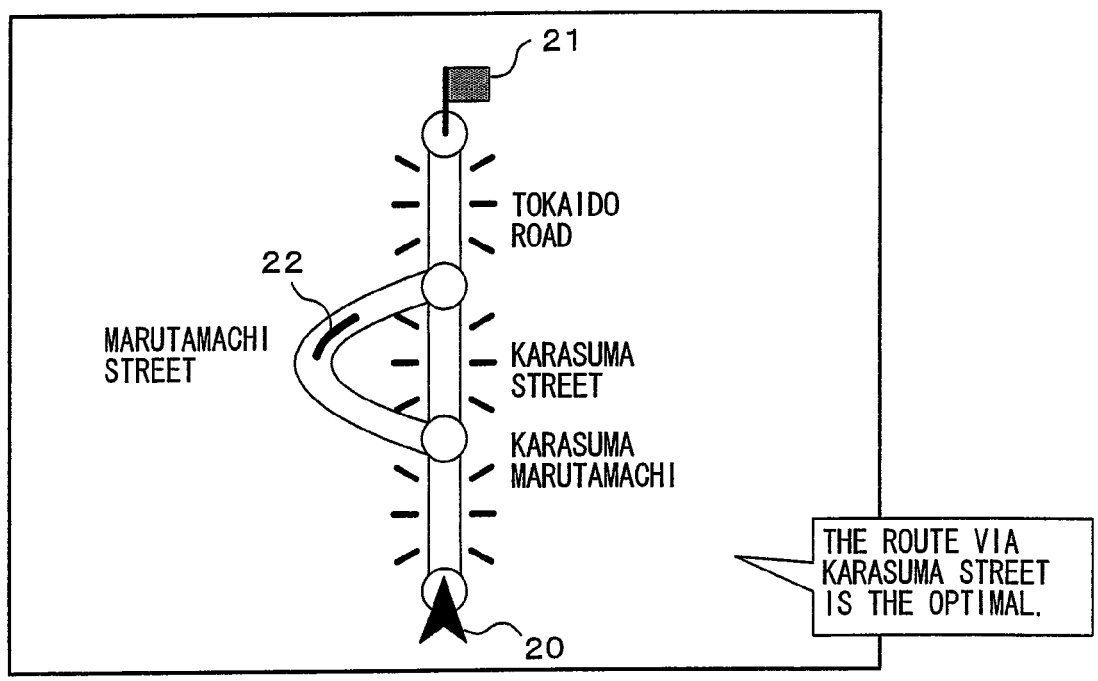
FIG. 3 is a figure showing a situation in which a piece of voice information about the optimal route is outputted and the corresponding part is highlighted in the whole route map.

FIG. 3 shows a situation in which a piece of voice information about the optimal route is outputted, as well as a corresponding highlight subject part is highlighted in the whole route map. At this time, the navigation apparatus 1 outputs a voice "The route via Karasuma Street is the optimal" as a piece of voice information that indicates the optimal route. Furthermore, in synchronization with the output of this voice information, the navigation apparatus 1 causes the part of the optimal route to flash for highlighting in the whole route map. By doing this, the part corresponding to the outputted voice information will be highlighted.

Figure 4:
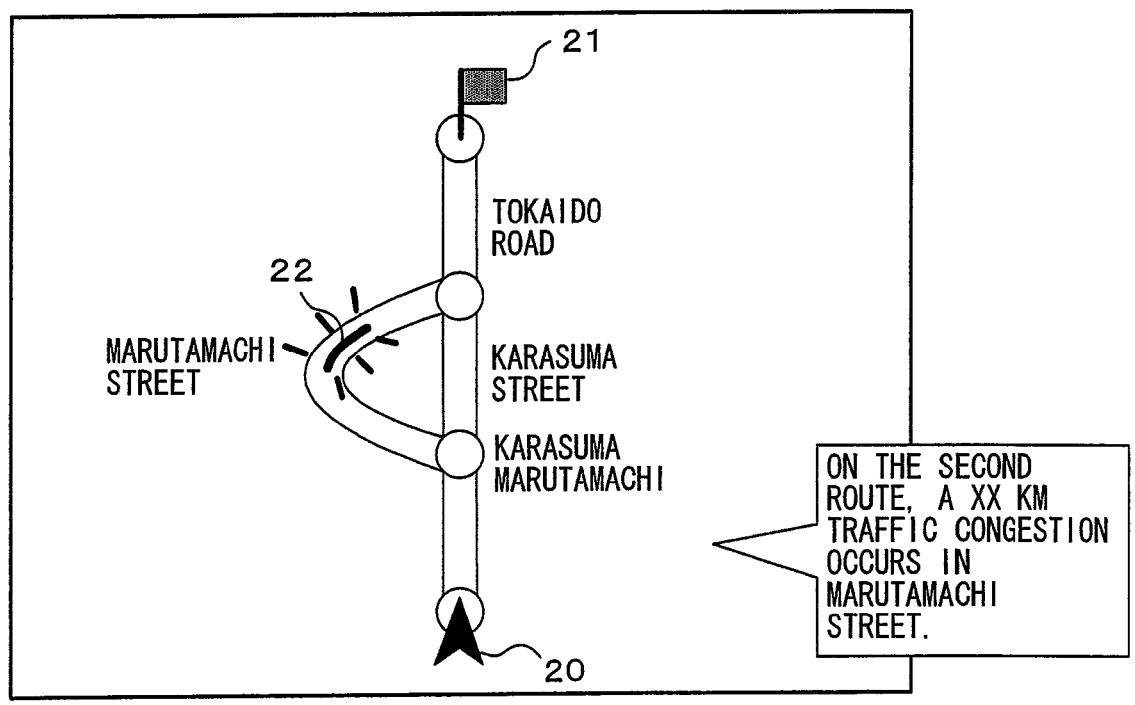
FIG. 4 is a figure showing a situation in which a piece of voice information about traffic congestion on the route is outputted and the corresponding part is highlighted in the whole route map.

On the other hand, FIG. 4 shows a situation in which a piece of voice information about traffic congestion of the route is outputted, as well as a corresponding highlight subject part is highlighted in the whole route map. At this time, the navigation apparatus 1 outputs a voice "On the second route, a XX Km traffic congestion occurs in Marutamachi Street" as a piece of voice information that indicates traffic congestion status on the route. Furthermore, in synchronization with the output of this voice information, the navigation apparatus 1 causes the corresponding traffic congestion mark 22 in the whole route map to flash for highlighting.

It should be understood that, when highlighting the corresponding part of the whole route map as well as outputting voice information for a plurality of types of events that have causality, the navigation apparatus 1 may output the voice information and highlight the map so that the user understand the causality. For instance, when a traffic accident happens in the route while the whole route map of FIG. 4 is being displayed and a traffic congestion accordingly occurs, the navigation apparatus 1 outputs a voice "On the second route, a traffic accident happens in Marutamachi Street" and a voice "A XX Km traffic congestion occurs due to this accident" in a row as voice information. Furthermore, the navigation apparatus 1 highlights a point of the occurrence of the accident at outputting the former voice information and highlights the traffic congestion mark 22 at outputting the latter voice information. This brings an easy-to-see display of the causality of each of the events.

Furthermore, it would also be acceptable to highlight a highlight subject part using a method other than flashing. The highlight subject part may be highlighted in a manner for a display different from that for other parts by changing the highlight subject part, for example, in color, shape, size, font, background color, presence of shadow, or the like. Other than these, any method may be applied for highlighting as long as the highlight subject part is highlighted distinguishably from other parts.

Figure 5:
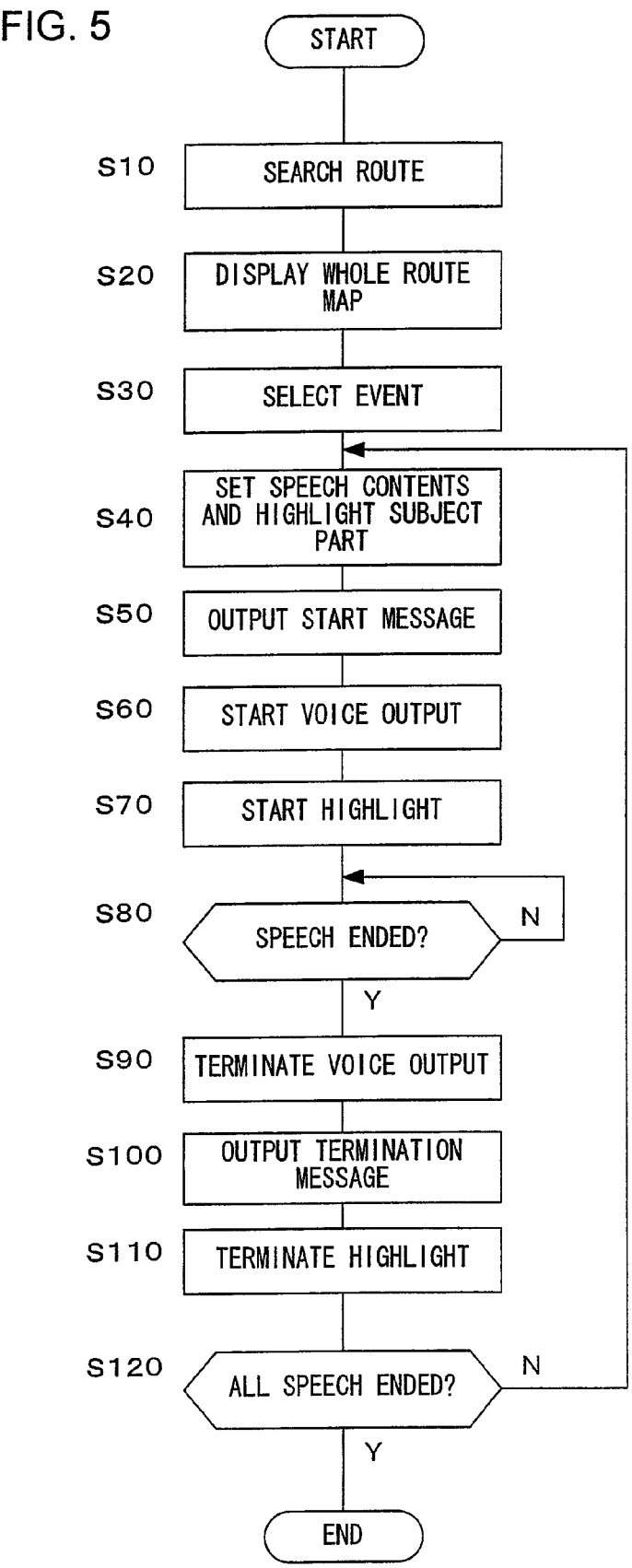
FIG. 5 is a flowchart of process to output a piece of voice information and to highlight the corresponding part of the whole route map.

As explained above, a flowchart of process to output voice information and to highlight the corresponding part of the whole route map is shown in FIG. 5. The process shown in this flowchart is executed by the control unit 10. It should be understood that when executing the process in the flowchart of FIG. 5, the control unit 10 functions as a map drawing unit that draws the whole route map and displays it on the display monitor 16, a voice synthesis unit that synthesizes voice and outputs voice information through the speaker 17, and an entire control unit that controls the whole processing.

In a step S10, by the processing by the entire control unit, the control unit 10 performs route search. Here, when a destination is set according to the operation by the user, a plurality of routes are searched between the vehicle position and the destination based on map data recorded in the HDD 13.

In a step S20, by the processing by the map drawing unit, the control unit 10 displays the whole route map that shows the whole situation of the route searched in the step S10 on the display monitor 16. By doing this, the whole route map as in FIG. 2 is displayed.

In a step S30, by the processing by the entire control unit, the control unit 10 selects events for determining the contents of voice information. Here, as described above, any of the various types of events related to the whole route map displayed in the step S20 are selected according to the operation by the user.

In a step S40, by the processing by the entire control unit, the control unit 10 sets speech contents and the highlight subject part to the voice synthesis unit and the map drawing unit respectively, according to the selection of events in the step S30. For example, among various voice data that have been set in advance for each predetermined phrase, the control unit 10 sets the contents of speech by the entire control unit designating combination of voice data to be spoken according to the selected events to the voice synthesis unit. At this time, fixed phrases for each event or voice data of the name of place or road or the like may be used. And, the control unit 10 sets the highlight subject part by the entire control unit designating the part of the whole route map displayed in the step S20 that corresponds to the speech contents which have been set to the map drawing unit.

It should be understood that the speech contents and the highlight subject part set in the step S40 variously changes according to the situation in which the vehicle is. In other words, even though the same event was selected in the step S30, if there is a difference in roads the route takes, in situations of the traffic congestion, and so on, the speech contents and the highlight subject part will be set with different contents respectively.

In a step S50, by the processing by the entire control unit, the control unit 10 outputs directions (start message) for the voice synthesis unit and the map drawing unit to start outputting voice information and highlighting the whole route map respectively. After the start messages are thus outputted, the control unit 10 performs the process of a step S60 in the voice synthesis unit and starts outputting voice information according to the speech contents set in the step S40. Concurrently, the control unit 10 performs the process of a step S70 in the map drawing unit and starts highlighting the highlight subject part set in the step S40. By doing this, the map drawing unit starts highlighting the highlight subject part when the voice synthesis unit starts outputting the voice information.

In a step S80, by the processing by the voice synthesis unit, the control unit 10 determines whether or not the speech has ended. If the speech has not ended, in other words, if voice information with the speech contents set in the step S40 has yet to be outputted, the control unit 10 stands by in the step S80. If the speech has ended, in other words, if voice information with the speech contents set in the step S40 has been outputted, the control unit 10 proceeds with the flow of process to a step S90.

In the step S90, by the processing by the voice synthesis unit, the control unit 10 terminates the output of the voice information. In a step S100, the control unit 10 outputs a direction (termination message) to terminate highlighting by the map drawing unit from the voice synthesis unit to the entire control unit. This termination message is outputted to the map drawing unit via the entire control unit.

In a step S110, by the processing by the map drawing unit, the control unit 10 terminates highlighting the highlight subject part in response to the termination message which was outputted from the voice synthesis unit in the step S100. By doing this, the map drawing unit terminates highlighting the highlight subject part concurrently with the voice synthesis unit terminating the output of the voice information.

In a step S120, the control unit 10 determines whether or not all the speech have been ended about the voice information to be spoken by the voice synthesis unit. If the control unit 10 determines that there still exists voice information left to be spoken, it returns the flow of process to the step S40. After the control unit 10 sets the next speech contents and the highlight subject part in the step S40, it repeats the processing as described above. If the control unit 10 determines that there does not exist any voice information left to be spoken, on the other hand, it terminates the process in the flowchart of FIG. 5. This ends both outputting the voice information and highlighting the corresponding part of the whole route map.

According to the embodiment described above, the following advantageous effects can be achieved.

(1) By the processing performed by the control unit 10, the navigation apparatus 1 displays the whole route map on the display monitor 16 (step S20) and outputs voice information related to traveling of the vehicle through the speaker 17 (step S60). At this time, in synchronization with the output of the voice information in the step S60, the navigation apparatus 1 highlights a part of the whole route map that corresponds to the voice information (step S70). Since this is done, when voice information is outputted, it is possible to inform the user of which part of the map that is being displayed the voice information corresponds to in an easily understood manner.

(2) The navigation apparatus 1 starts highlighting in the step S70 when outputting of voice information is started in the step S60. Furthermore, the navigation apparatus 1 terminates highlighting (step S110) concurrently with termination of the output of voice information (step S90). Since this is done, it is possible to precisely synchronize the output of the voice information with the highlight of the map.

(3) The navigation apparatus 1 selects events to be voice-guided according to the operation by the user (step S30). The navigation apparatus 1 determines the contents of voice information to be outputted in step S60 according to the events selected in the step S30 (step S40). Since this is done, it is possible to output voice information with contents desired by the user.

(4) In the step S70, the navigation apparatus 1 highlights a part that corresponds to voice information to be outputted in the step S60 by changing the part in any of flashing, color, shape, size, font, background color, or presence of shadow. Since this is done, it is possible to highlight the part in an easily understood manner.

It should be understood that, in the above described embodiment, an example was explained in which output timing of the voice information and highlight timing of the map were synchronized with each other in the following manner: sending a start message from the entire control unit for starting the output of the voice information and the highlight of the map, and sending a termination message from the voice synthesis unit for terminating them. However, the both timings may also be synchronized in another manner. For example, after calculating necessary time for speech in the entire control unit in advance, the navigation apparatus 1 starts output of voice information and highlight of map simultaneously, and terminates them after the calculated length of time has passed. At this time, necessary time for speech may also be calculated with a plurality of events collectively, or may also be calculated by each event. The same advantageous effects as previously described can be achieved also in this manner.

Although, in the above described embodiment, the explanation is made on an example in which voice information is outputted and a corresponding part in the whole route map is highlighted while the whole route map as in FIG. 2 is being displayed, contents of map to be displayed are not limited by these details. For instance, even when a normal map that shows the surroundings of the vehicle position or an arbitrary point, an intersection guidance map that shows a simplified road shape between the vehicle position to the next directed intersection, or the like is being displayed, similarly, voice information is outputted as well as a corresponding part of the map is highlighted. Other than these, the present invention can be applied to various types of maps.

The above described embodiments and variations are examples, and the present invention is not limited to these examples unless departing from the scope of the invention.

What is claimed is:

1. A navigation apparatus, comprising:
a control unit;
a map display control unit that displays a map on a display monitor;
a voice information outputting unit that outputs voice information related to traveling of a vehicle;
a highlighting unit that highlights a part of the map that corresponds to the voice information in synchronization with output of the voice information by the voice information outputting unit;
a selection unit that selects an event to be voice-guided according to an operation by a user; and
a determination unit that determines contents of the voice information according to the event selected by the selection unit, wherein:
the control unit controls performing of route search processing by a predetermined algorithm from a departure point to a destination,
when a plurality of routes from the departure point to the destination are searched by the route search processing, the control unit controls displaying of a whole route map in which the plurality of routes are abridged on the display monitor,
when any one of the routes displayed in the whole route map is selected by the user, the control unit controls guiding of the vehicle to the destination along the selected route,
the control unit calculates a necessary time for speech to output the voice information related to the traveling of the vehicle by the voice information outputting unit,
the highlighting unit starts highlighting the part that corresponds to the voice information when the voice information outputting unit starts outputting of the voice information, and
if the necessary time calculated by the control unit has elapsed from the start of highlighting by the highlighting unit and the start of outputting of the voice information by the voice information outputting unit, the highlighting unit terminates highlighting the part that corresponds to the voice information and the voice information outputting unit terminates outputting of the voice information.

2. A navigation apparatus according to claim 1, wherein:
the highlighting unit highlights the part that corresponds to the voice information by changing the part in any of flashing, color, shape, size, font, background color, or presence of shadow.

3. A navigation apparatus according to claim 1, wherein:
the selection unit selects at least one of an optimal route, traffic congestion, a speed limit, a closed road, a traffic accident, a passing road, a passing intersection, necessary time for destination, drive time, a facility at which the vehicle can stop off, gas mileage, a toll, or drivability, as the event.

* * * * *